J. C. MUTHER.
BED TO BE USED IN VEHICLES.
APPLICATION FILED JULY 19, 1915.
1,171,531.   Patented Feb. 15, 1916.
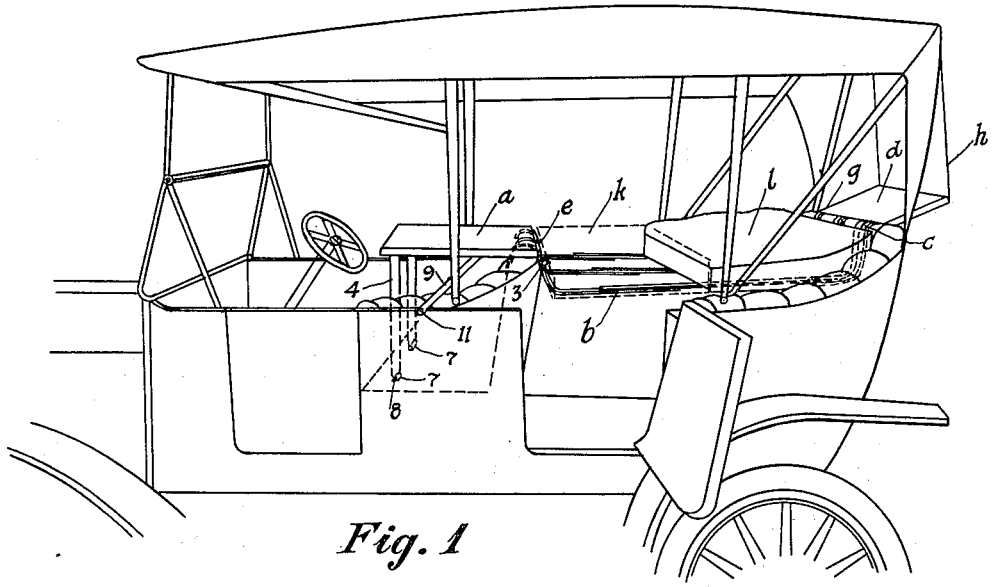
Fig. 1
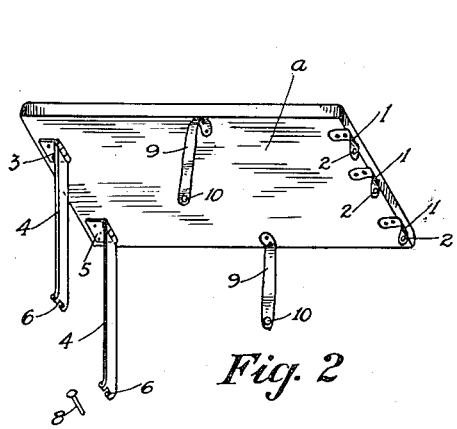
Fig. 2
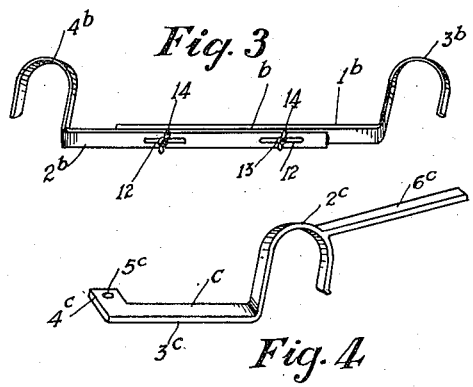
Fig. 3
Fig. 4
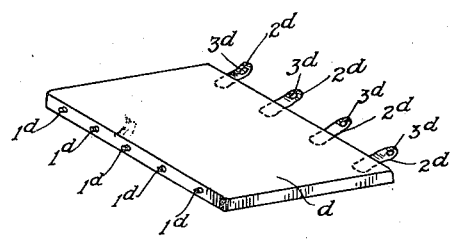
Fig. 5
WITNESSES
Edgar E. Hendee
Minnie Korte
INVENTOR
JOHN C. MUTHER
by E. E. Rodabaugh
Attorney

UNITED STATES PATENT OFFICE.

JOHN C. MUTHER, OF SAN DIEGO, CALIFORNIA.

BED TO BE USED IN VEHICLES.

1,171,531.

Specification of Letters Patent.  Patented Feb. 15, 1916.

Application filed July 19, 1915.  Serial No. 40,582.

*To all whom it may concern:*

Be it known that I, JOHN C. MUTHER, a citizen of the United States, residing at San Diego, in the county of San Diego and State of California, have invented a new and useful Improvement in Beds to be Used in Vehicles, of which the following is a specification.

My invention relates to improvements in beds which are intended to be used in automobiles or other vehicles to furnish sleeping quarters therein, and the objects of my invention are: first, to provide such a bed that may be constructed by using a small amount of materials aside from that generally used in the vehicle; second, that will occupy a very small space in the vehicle when the bed is not in use; third, that can very quickly be placed in position for use and as quickly removed when desired, and, fourth, that is simple and economical of construction and easily understood.

This is an improvement on the construction shown by me in a former application for Letters Patent filed April 26, 1915, Serial No. 23,936, for bed for use in a vehicle.

The means by which I obtain these objects are shown in the accompanying drawings, in which:

Figure 1 is a perspective view of a part of an automobile equipped with my device, a portion of the bed being removed for better illustration; Fig. 2 is a perspective view of the front extension member of my device, taken from below; Fig. 3 is a perspective view of one of the adjustable supports; Fig. 4 is a perspective view of one of the rear extension member supports, and Fig. 5 is a perspective view of one of the rear extension members.

The principal parts of my invention are the front extension member "$a$", supports "$b$", rear extension supports "$c$" and rear extension member "$d$".

The front extension member "$a$" is rectangularly shaped, and of approximately the same length as the seat of the vehicle, and is of a width to be properly accommodated between the back of the front seat "$e$" and the steering apparatus of the vehicle. It is preferably made of wood or other stiff material and may be covered with a padded top surface if desired, which serves as a cushion. It is provided on its lower surface, near the edge which rests adjacent to the back of the front seat of the vehicle with a plurality of straps "1". These straps "1" are provided with eyelets "2" which are adapted to fit over hooks "3" mounted in the back of the front vehicle seat "$e$". The member "$a$" is also provided with legs "4" which are mounted on the lower surface of the member "$a$" by means of hinged members "5". The legs "4" are adapted, by means of the hinge members "5" to be folded back against the lower surface of the member "$a$" when said front extension member is not in use, and, when said member "$a$" is in use, the legs 4, which are each provided with a hole "6" in its extended end adapted to receive a pin 8, to secure it to the member 7 in the bottom of the seat "$e$" of the vehicle, are in a vertical position as shown best in Fig. 1. The member "$a$" is also provided with cables "9" which are attached to its under surface near the edges as shown best in Fig. 2. These cables "9" are provided with eyelets "10". These eyelets "10" are adapted to be placed on supports 11 mounted in the side of the vehicle and serve to hold the said front extension member "$a$" securely in position when the cables "9" are drawn taut and the eyelets "10" are hooked on the supports "11".

The supports "$b$" are yoke-shaped and are composed of two members "$1^b$" and "$2^b$". The member "$1^b$" is provided at its one end with a bent portion "$3^b$" which is adapted to hook over and rest on the back "$g$" of the rear seat of the vehicle or other support, and is sufficiently off-set so that when placed in position with the cushions resting thereon, as hereinafter shown, the top of the cushions will be level with the back of the seat of the vehicle or other support on which said bent portion rests. The member "$2^b$" is provided with a similarly bent portion "$4^b$" which is adapted to hook over and rest on the back of the front seat "$e$" or other support of said vehicle. The members "$1^b$" and "$2^b$" are each provided with slots "12" spaced apart equally in each of said members, and when said members "$1^b$" and "$2^b$" are placed in position one on the other with their bent ends turned in opposite directions, the said slots will coincide and the members may be held firmly together by means of bolts "13" inserted in said slots "12". The bolt "13" is provided with a thumb-nut "14" to facilitate its tightening, loosening and removal. By reason of the slots "12" in the members "$1^b$" and "$2^b$" the support "$b$" may be adjusted laterally to suit the distance between the backs of the seats of the vehicle, or other supports on which the bent ends of said supports "b" rest. Two or more of the supports "b" may be used, but I have shown only three in this application.

The back extension support "c" is provided with a bent portion "2c" which is similar and conforms with the portion "3b" of the support member "1b". It is also provided with a straight portion "3c" which is of a sufficient length to extend from the bent portion "3b" to the slot "12" in the member "1b". The portion "2c" is also provided with a portion "4c" which extends at right angles to the portion "3c", and is provided with a bolt hole "5c". The portion "4c" of the member "c" is of a sufficient length to conform to the slot "12" in the member "b" when the member "c" is placed opposite the member "1b" with the bent portion "2c" conforming with the bent portion "3b" so that the bolts "13" may be inserted through slots "12" and the hole "5c", thereby holding the members "b" and "c" firmly together. The member "c" is also provided on its bent portion "2c", at a point slightly below the top of the said bent portion, with an outwardly extending straight portion "6c". This portion "6c" is adapted to act as a support for the rear extension member "d".

The rear extension member "d" is rectangularly shaped and is made of wood or other material and is provided on its one edge with a plurality of buttons "1d" which are adapted to be inserted in the eyelets in the margin of the curtain "h" of the vehicle when said member "d" is placed in position for use in said vehicle. The member "d" is also provided, near the edge opposite to the one on which said buttons "1d" are placed, with a plurality of cables "2d" attached at their one end to the under surface of said member "d", and are provided at the other end with an eyelet "3d" which is adapted to fit on the buttons "1d" mounted in the rear seat of the vehicle to which the rear curtain "h" of the vehicle is adapted to be ordinarily attached.

It is necessary that there be at least two of the members "c" used in actual operation of my bed, but a greater number may be used if desired. In case only two of said members "c" are used, they should be made in pairs, one right and the other left, so as to conform better to the members "b" in conjunction with which they are used.

In using, the cushions of the vehicle are first removed and then the front extension member "a" is placed in position in the front seat, and the straps 1, by means of the eyelets "2" therein, are attached to the hooks "3" in the back of the front seat "e". The legs "4" are placed in position to support the member "a" and stand vertically resting on the bottom of the front seat of the vehicle where they are attached by the pins "8". The cables "9" are drawn taut and attached to the support "11" by means of the eyelets "10". The supports "b" are then placed in position with the hook "4b" resting over and on the top of the back of the front seat "e" or other support, and the hook "3b" similarly resting over and on the top of the rear seat "g" of the vehicle, and the bent portions of the support "c" resting side by side with the portion "1b" of the support "b". The cushions "k" and "l" of the vehicle are then placed across the supports "b" and the rear extension member is placed on the portion "6c" of the rear extension support "c". When the said cushions "k" and "l", the front extension member "a" and the rear extension member "d" are all placed in position as hereinbefore set forth, the tops of said cushions and the members "a" and "d" will be practically level with each other and level with the top of the front and rear seats of the vehicle, and thus form a complete bed.

To take down the bed, the cushions "k" and "l" are removed from the supports "b"; the rear extension member "d" is removed, and the supports "b" and "c" may then be removed. The front extension member "a" is removed by loosening the cables and removing the pins "8;" when the said front extension member may be laid in the rear seat of the vehicle under the vehicle cushion. By removing the nut "14" the supports "b" and "c" may be taken apart and, with the rear extension member "d," be wrapped in a small package and stored away in the vehicle.

What I claim as new, and desire to secure by Letters Patent, is:

1. In a bed for a vehicle, a plurality of adjustable supports each consisting of three members, each of which is provided with a bent portion adapted to hook over the back of a vehicle seat and a straight portion, said straight portions being each adapted to lie parallel to each other, coinciding slots in two of said straight portions and said third member provided in an off-set portion, near the end of its straight portion, with a bolt hole conforming to said slots, and with another straight outwardly extending portion on its bent portion at an oblique angle to said other straight portion, and a plurality of means for fastening said three members securely together.

2. A bed for a vehicle comprising a plurality of adjustable supports each provided at its ends with bent portions adapted to hook on at one end on the back of a front seat of a vehicle and at its other end on the back of the rear seat of said vehicle, a plurality of hooks mounted in the back of said front seat, a front extension member adapted to be mounted at its rear end on said hooks by means attached to said front extension member and to supports in the side of said vehicle by other means attached thereto, a plurality of legs hinged to said front extension member, a plurality of rear extension support members mounted on the back of the rear seat of said vehicle and attached, one to each of said first mentioned support members, a rear extension member mounted on said rear extension support members, and a plurality of cushions mounted on and across said adjustable support members.

3. In combination with a two seated vehicle, a plurality of hooks disposed and mounted in the back of the front seat of said vehicle, a front extension member provided with means at its one edge adapted to fit on said hooks, a plurality of legs hinged to said front extension member, a plurality of cables attached thereto to secure same in position, a plurality of adjustable supports each adapted at one end to hook over and rest on the back of the front seat of a vehicle and at the other end to hook over and rest on the back of the rear seat of said vehicle, a plurality of rear extension supports each adapted to be mounted on one of said adjustable supports and on the back of the rear seat of said vehicle provided with a backwardly extending portion thereon, a rear extension member adapted to be mounted on said backwardly extending portion, and the cushions of said vehicle disposed on said supports in connection with said front extension member and said rear extension member to form a bed.

4. In a device of the kind described, a three piece adjustable support comprising two members each provided with a straight portion and a hook portion at one end and a plurality of slots disposed in said straight portions so that when said two members are placed with the straight portions resting one on the other and their hooked ends extending in opposite directions said slots will coincide, said third member provided with a similarly hooked portion at one end and a straight portion adjacent thereto provided with an off-set at the extended end of said straight portion with a hole therein, extending from said hooked portion and adapted, when placed side by side with either of said other members, to have said hooked portions coincide and said off-set to rest on said other members, and the hole in said off-set coincide with said slots, and an outwardly extending straight portion on its hooked portion at an oblique angle to its other straight portion, and means for fastening said members securely together.

In testimony whereof, I have hereunto subscribed my name in the presence of two subscribing witnesses.

JOHN C. MUTHER.

Witnesses:
 ELMER E. RODABAUGH,
 MINNIE KORTE.